(12) United States Patent
Musa

(10) Patent No.: US 7,305,547 B2
(45) Date of Patent: Dec. 4, 2007

(54) METHOD FOR UPGRADING A HOST/AGENT SECURITY SYSTEM THAT INCLUDES DIGITAL CERTIFICATE MANAGEMENT AND AN UPGRADABLE BACKWARD COMPATIBLE HOST/AGENT SECURITY SYSTEM DIGITAL CERTIFICATE INFRASTRUCTURE

(75) Inventor: Mehmet Musa, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 10/186,901

(22) Filed: Jun. 28, 2002

(65) Prior Publication Data

US 2004/0003235 A1   Jan. 1, 2004

(51) Int. Cl.
    *H04L 9/00* (2006.01)

(52) U.S. Cl. ............... 713/155; 713/156; 713/157; 713/175

(58) Field of Classification Search ........ 713/155–158, 713/175; 709/225; 726/10; 380/277
    See application file for complete search history.

(56) References Cited

U.S. PATENT DOCUMENTS

| | | | | |
|---|---|---|---|---|
| 5,659,616 A | * | 8/1997 | Sudia | ............... 705/76 |
| 6,192,130 B1 | * | 2/2001 | Otway | ............... 380/277 |
| 6,308,277 B1 | * | 10/2001 | Vaeth et al. | ............... 726/10 |
| 6,816,900 B1 | * | 11/2004 | Vogel et al. | ............... 709/225 |
| 2003/0182549 A1 | * | 9/2003 | Hallin et al. | ............... 713/156 |

* cited by examiner

*Primary Examiner*—Nasser Moazzami
*Assistant Examiner*—Fikremariam Yalew

(57) ABSTRACT

A host/agent system and security-certificate-management infrastructure enhanced to provide backward compatibility, despite launching of new administrative host processes employing new software versions, to avoid regenerating and redistributing security certificates to existing agents. Certificate management is removed from the administrative host process and embedded within a new certification-authority entity. The new certification-authority entity generates new digitally signed security certificates using the previously generated host private decryption key, inherited as the new CA private decryption key by the CA. The administrative host software can be upgraded to a new version that includes security-certificate-management tools provided by a new vendor, without the need for generation of a new encryption/decryption key pair for verifying and digitally signing security certificates and concomitant obsolescence of the existing, already distributed security certificates.

12 Claims, 14 Drawing Sheets

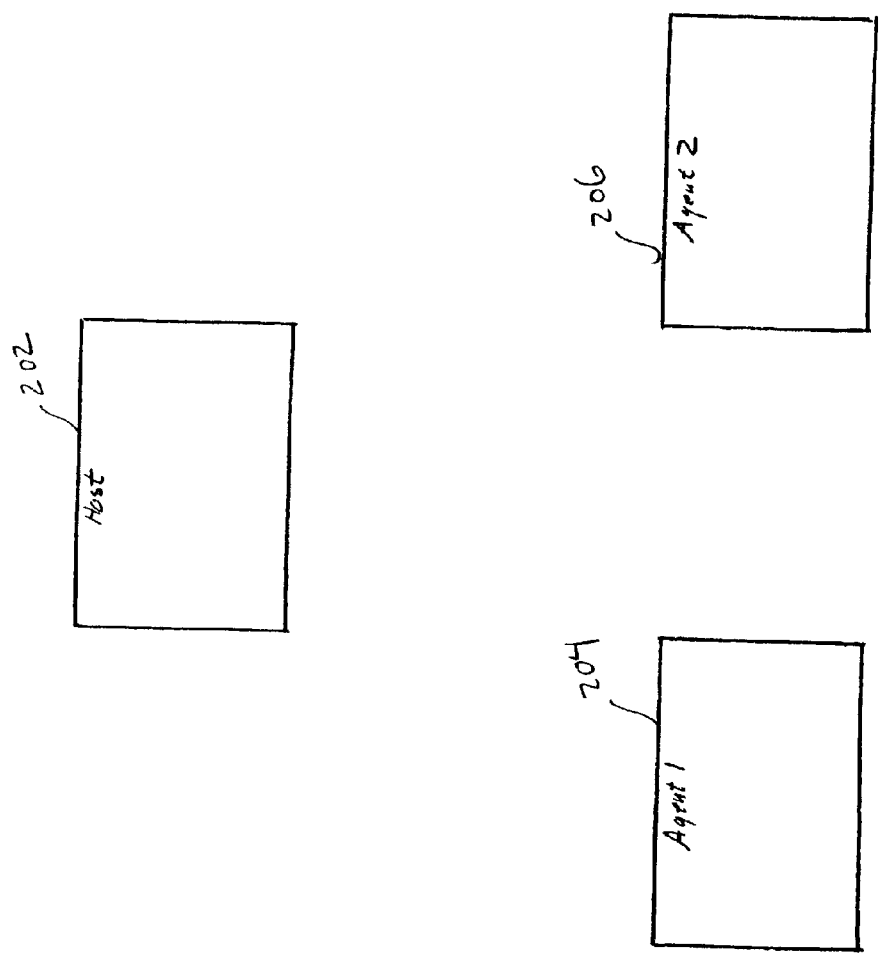

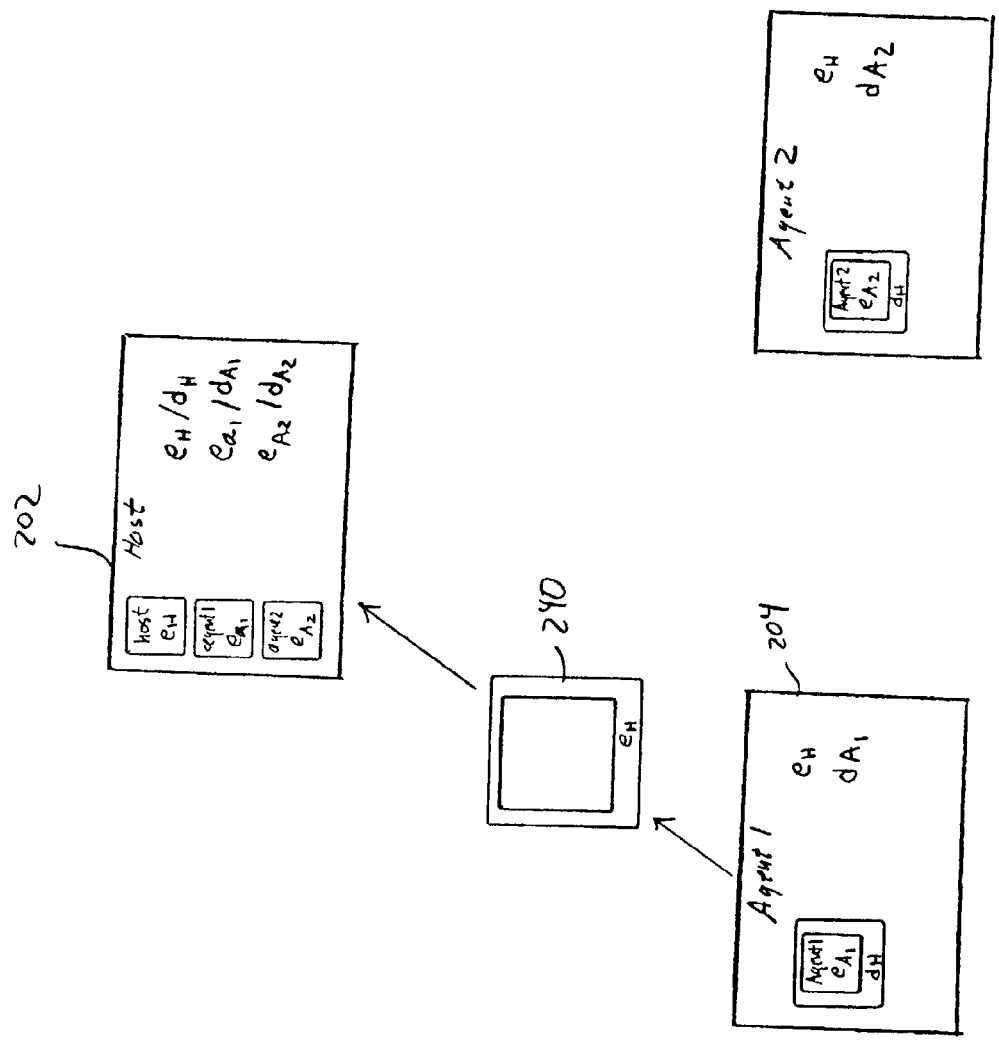

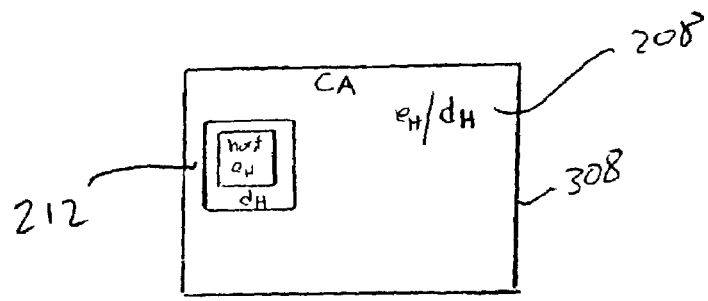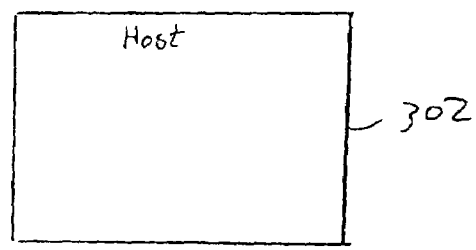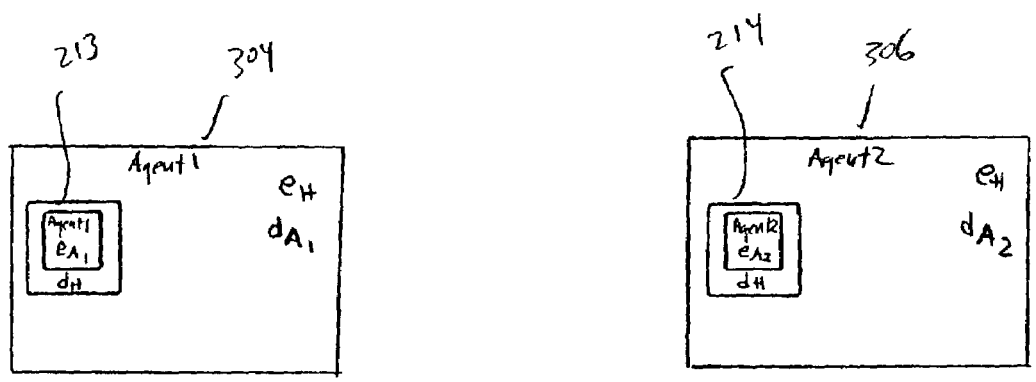
Figure 3A

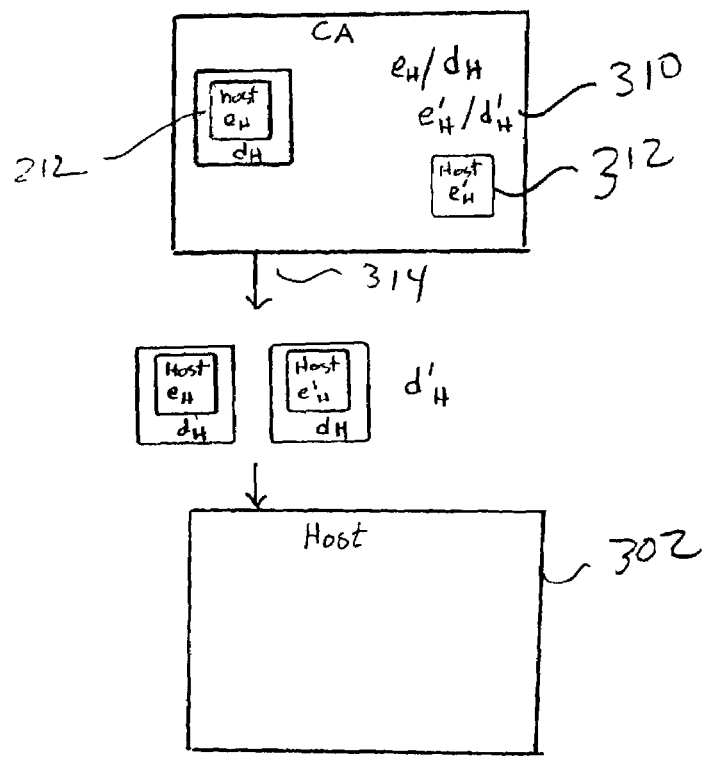
Figure 3B

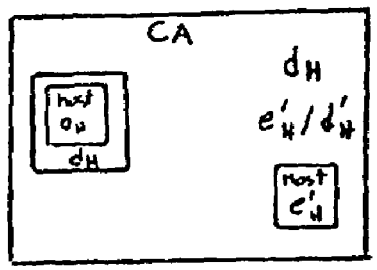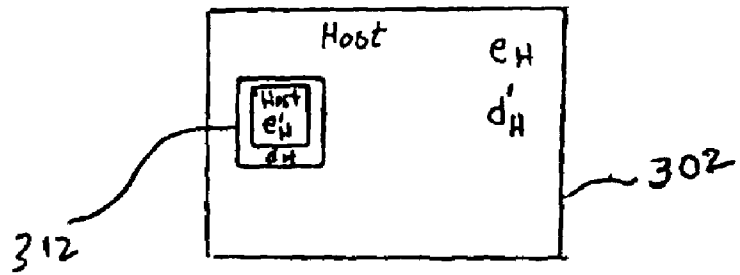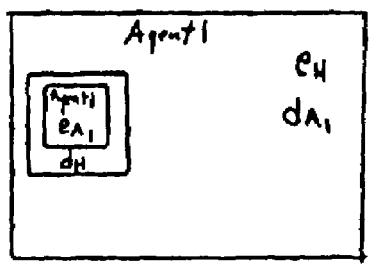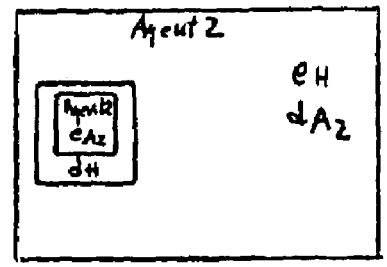
Figure 3C

METHOD FOR UPGRADING A HOST/AGENT SECURITY SYSTEM THAT INCLUDES DIGITAL CERTIFICATE MANAGEMENT AND AN UPGRADABLE BACKWARD COMPATIBLE HOST/AGENT SECURITY SYSTEM DIGITAL CERTIFICATE INFRASTRUCTURE

TECHNICAL FIELD

The present invention relates to updating a multi-process software system and, in particular, to a method and system for updating, or replacing, host software in a host/agent software system that generates and uses security certificates to facilitate secure communications between the host process and each agent process.

BACKGROUND OF THE INVENTION

The present invention is related to upgrading software systems. In general, software systems evolve over time, and software vendors produce many successive versions of commercially successful software programs. A software upgrade involves replacing a current version, resident within a computer system, with a newer version. In general, software vendors seek to produce backward-compatible versions, so that a process executing a new software version that has replaced an older software version can use any non-volatile data stored by an earlier process running the older software version in the computer system, and so that the new version supports input and output formats supported by previous versions. Backwards compatibility minimizes the impact of software updates on users.

Certain types of software systems comprise a number of inter-cooperating, independent processes. An example of such a system is a secure host/agent system comprising an administrative host process that provides an interface and management tools to a system administrator or other user, and that cooperates with various agent processes, resident within different components of the system, including remote computers, that report error conditions to the administrative host process and that carry out various tasks assigned to the agents by the administrative host process. In such systems, it is vital for the administrative host process to communicate with the agent processes in a secure fashion.

Many different types of secure communications protocols are currently available. A popular secure communication protocol employs the secure socket layer protocol ("SSL-protocol"). Third parties vendors provide SSL-protocol modules that can be incorporated into software systems, such as the host/agent system described above. The SSL-protocol employs digitally signed security certificates that are produced by security-certificate-management tools and distributed among potentially inter-communicating processes, generally by physically transporting the security certificates, from where they are created, to remote computer systems via floppy diskettes or other physical, transportable, non-volatile storage devices. A security certificate is employed by a process to open a secure communications connection with a different process. It is common to embed the security-certificate-management tools within the administrative host of a host/agent system. The administrative host generates digitally self-signed security certificates that it transmits to agents to allow agents to subsequently initiate secure communications sessions with the administrative host. The security-certificate-management tools within the administrative host generate an encryption/decryption key pair used to digitally sign the security certificate and to verify the security certificate distributed to the agents.

Vendors of host/agent systems frequently create new, improved versions of the administrative host software, and distribute these new versions to users. Unfortunately, in many cases, when new security-certificate-management tools produced by a new vendor are incorporated into a new version of the administrative host software, it is not possible for the new security-certificate-management tools to incorporate existing encryption/decryption key pairs. For example, in certain cases, when a process that runs the new version of the administrative host software is launched, the process running the new version of the administrative host software calculates new encryption/decryption key pairs for digitally signing and verifying security certificates, and cannot receive former key pairs. The new security-certificate-management tools, may, for example, store encryption/decryption key pairs, and other vital cryptographic information, including pseudo-random-number-generator initialization data, in proprietary data formats, and insist that any encryption/decryption pairs used in the system be either generated by the new security-certificate-management tools, or retrieved in the proprietary format from storage.

At the point that the new encryption/decryption key pairs are generated, the security certificates distributed to agent processes by a prior administrative host process running the previous version of the administrative host software become out-of-date, and invalid. Unfortunately, it is a laborious and time-consuming task for a system administrator, or other user, to manually update all existing agent processes of a host/agent system following upgrading of the administrative host software. For this reason, host/agent system software vendors and users of host/agent systems have recognized the need for a technique to provide backward compatibility in a new version of the administrative host software of a host/agent system, including new versions of administrative host software that incorporate security-certificate-management tools provided by a different vendor from the vendor that supplied the security-certificate-management tools used in the previous version of the administrative host software.

SUMMARY OF THE INVENTION

In one embodiment of the present invention, a multi-process, host/agent system is enhanced to provide backward compatibility in a new administrative host software version by avoiding invalidating security certificates previously distributed to agent processes due to regeneration of encryption/decryption keys used for generating and verifying security certificates. In the described embodiment, below, the security-certificate-management tools are moved from the administrative host and embedded within a new, higher-level certification-authority entity that coexists with the administrative host process or runs in a separate process. The new certification-authority entity inherits the encryption/decryption key pair used to digitally sign security certificates previously generated and used in the previous instantiation of the previous version of the administrative host software. The administrative host software can be upgraded to a new version without loss of the previously generated encryption/decryption key pair used for verifying and signing security certificates and concomitant obsolescence of the existing, already distributed security certificates.

BRIEF DESCRIPTION OF THE DRAWINGS

FIGS. 2A-G illustrates operation of an example two-agent host/agent system.

FIGS. 3A-F illustrate a method for enhancing the two-agent host/agent system to allow for updating administrative host software without requiring re-certification of existing agents.

DETAILED DESCRIPTION OF THE INVENTION

In one embodiment of the present invention, described below, a new certification-authority entity is created to manage security certificates within a host/agent system comprising an administrative host process and a number of agent processes. In a first subsection, provided below, a description of the basic cryptographic methods employed in the host/agent system is discussed. In a second subsection, details of security-certificate-management exemplifying security-certificate-management within existing agent/host systems are provided. In a third subsection, one embodiment of the present invention is described.

Cryptography

Figure 1:
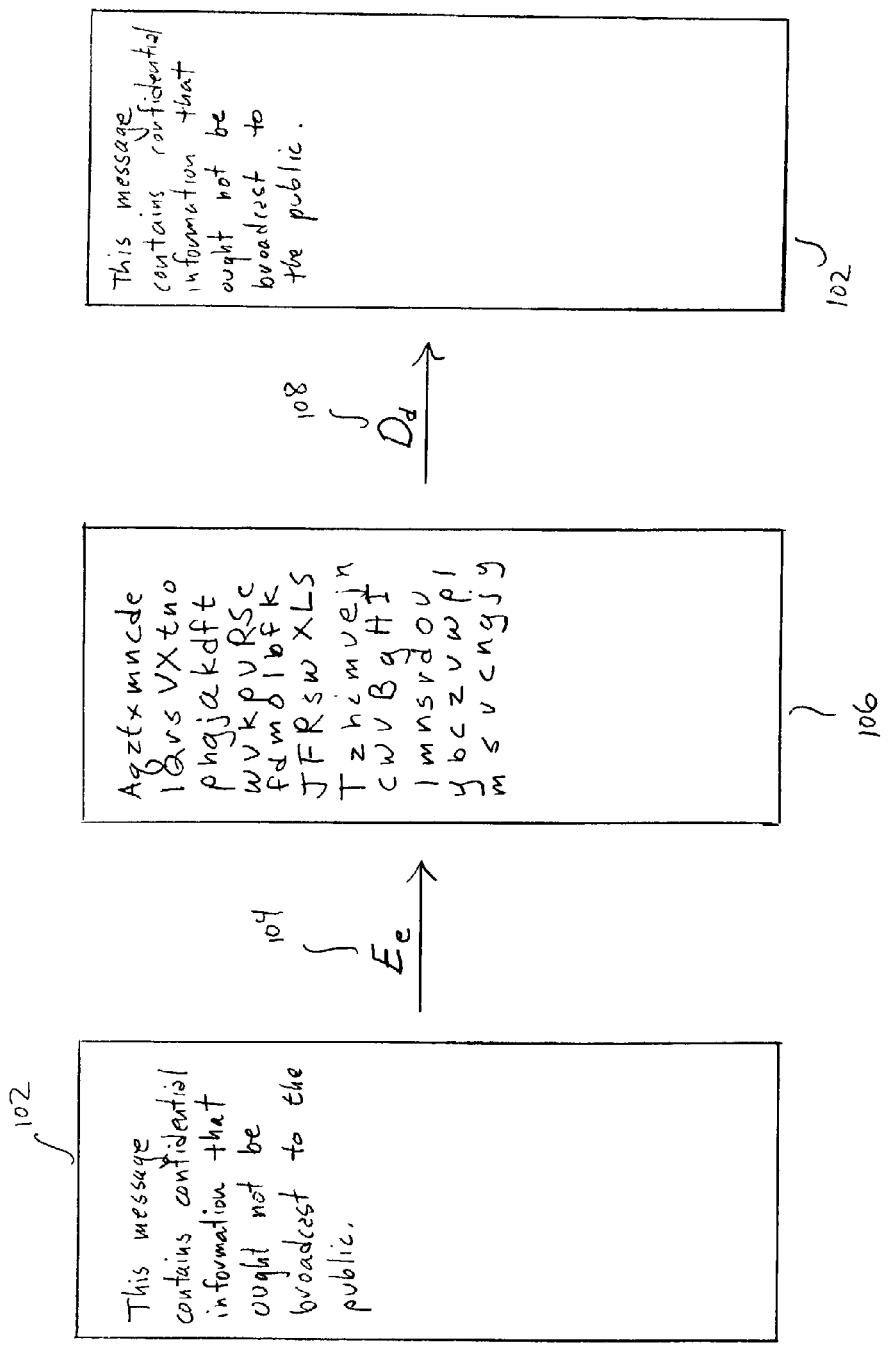
FIG. 1 illustrates a basic principle underlying cryptographic methodologies.

The present invention employs cryptographic methodologies in order to secure communications between an administrative console, or host, and remote agents. In this subsection, the basic cryptographic methods employed are described in general terms. FIG. 1 illustrates a basic principle underlying cryptographic methodologies. Cryptography is designed to transform plain text information into encoded information that cannot be easily decoded by unauthorized entities. For example, FIG. 1 shows a plain text message 102 that includes an English-language sentence. This plain text message can be encrypted by any of various encryption functions E 104 into a corresponding cipher text message 106 that is not readily interpretable. An authorized user is provided with a decryption function D 108 that allows the authorized user to decrypt the cipher text message 106 back to the plain text message 102.

The basic cryptographic methods can be described using the following definitions:

$A_m$=alphabet for messages=$\{a_{m_1}, a_{m_2}, a_{m_3} \ldots a_{m_n}\}$ $A_c$=alphabet for cipher-text=$\{a_{c_1}, a_{c_2}, a_{c_3} \ldots a_{c_n}\}$ $M$=message-space=strings of $a_m$ $C$=cipher-text space=strings of $a_c$ $K$=key space=$\{e_1, e_2 \ldots e_n\}$ where $E_{e_i}(m) \to c = \{d_1, d_2 \ldots d_n\}$ where $D_{d_i}(c) \to m$ Plain text messages are instances of messages contained within the message space M and cipher text messages are instances of the cipher text messages contained within cipher test space C. A plain text message comprises a string of one or more characters selected from a message alphabet $A_m$, while a cipher-text message comprises a string of one or more characters selected from the cipher-text alphabet $A_c$. Each encryption function E employs a key e and each decryption function D employ a key d, where the keys e and d are selected from a key space K.

A key pair is defined as follows:

key pair=$(e,d)$ where $e \in K$, $d \in K$, $D_d(E_e(m))=E_e(m)$, and $m \in M$ One key of the key pair, e, is used during encryption to encrypt a message to cipher text via an encryption function E, and the other key of the key pair, d, can be used to regenerate the plain text message from the cipher-text message via a decryption function D.

Public-key cryptographic methods are encryption/decryption techniques employing key pairs (e,d) having the property that, for all key pairs (e,d), no function $f(e)=d$ can be easily determined. Thus, the encryption key e of a public-key pair (e,d) can be freely distributed, because the corresponding decryption key d of the public-key pair cannot be determined from the encryption key e. A well-known example of public-key encryption is the RSA encryption scheme. The RSA scheme employs integer division of large numbers, generated from plain text and cipher-text messages, by large integers n that represent the product of two prime numbers p and q as follows:

$E(m)=m^e \bmod n$ $D(c)=c^d \bmod n$ $ed \bmod (p-1)(q-1)=1$ $n=pq$

Thus, a plain text message is encrypted by considering all of the numeric representations of the characters of the message to be a large number, computing the result of raising the large number to a power equal to the encryption key e, dividing that result by n, and using the remainder of the division as the encrypted message. Decryption employs the same process, raising the cipher-text message to a power equal to the decryption key d, then regenerating the plain text message by considering the remainder, followed by division by n, as a string of numerically represented characters.

A digital signature is a value generated from a message that can be used to authenticate the message. The digital signature space S contains all possible digital signatures for a particular digital signature algorithm applied to messages selected from message space M. Generation of a digital signature involves digital signature generation function $S_A$ applied to a message:

$S_A(m) \to s$

The digital signature s is sent, along with the message m from which the digital signature is generated, to a recipient. The recipient employs a public verification function $V_A$ to determine whether the digital signature authenticates the message or, in other words, whether the message was composed by the signer, and has not been modified in the interim. Thus, $V_A$ can be expressed, as follows:

$V_A(m,s) \to \{true, false\}$ where the result true indicates that the message m was composed by the signer who provided the digital signature s. Of course, if the entire message m is transformed to produce the signature s, only the signature s, and not the message/signature pair (m, s) need be sent to a recipient, who can both verify and generate the message in a single operation.

A digital-signature system can be generated from a reversible public-key encryption system, defined as follows:

for all $m$, $D_d(E_e(m))=E_e(D_d(m))$ where the message space, M=the cipher space, C=the digital signature space, S.

The digital-signature-generating function $S_A$ can be selected as:

$$S_A = D_d$$

so that:

$$S = D_d(m)$$

The verification function $V_A$ can then be selected as:

$$V_A(m, s) = \begin{cases} \text{true, if } E_e(s) = m \\ \text{false} \end{cases}$$

Thus, the techniques of the public key encryption technique can be used to generate digital signatures that can, in turn, be used by a digitally signed message recipient, to verify that a message was sent by the party supplying the digital signature.

Certificate-Management and Secure
Communications in Currently Available Host/Agent
Systems The security-certificate-management and secure communications within currently available host/agent software systems is described in this subsection with reference to FIGS. 2A-G. FIGS. 2A-G illustrates operation of an example two-agent host/agent system. FIGS. 2A-G, and FIGS. 3A-F discussed in the following subsection, employ a number of common, simple illustration conventions that are described with reference to FIGS. 2A-C. These illustration conventions are not again subsequently described. In the interest of brevity and clarity, certain of the numeric labels introduced in FIGS. 2A-C will be used throughout FIGS. 2D-G, and, similarly, numeric labels are repeated throughout FIGS. 3A-F.

FIG. 2A shows the three basic components of a two-agent host/agent system. An administrative host process 202 provides an interface to a system administrator or other user and interfaces with two, independent agent processes 204 and 206. A host/agent system may comprise one or more administrative host processes, such as host process 202, and many hundreds of thousands of agent processes, such as agent processes 204 and 206. As discussed above, the administrative host employs agent processes to monitor remote computers and other system components and report back error conditions, included attempted security breaches, to the administrative host for compilation and reporting to a system administrator or other user. In addition, the host may direct the agent processes to carry out various tasks in response to detected error conditions.

Figure 2C:
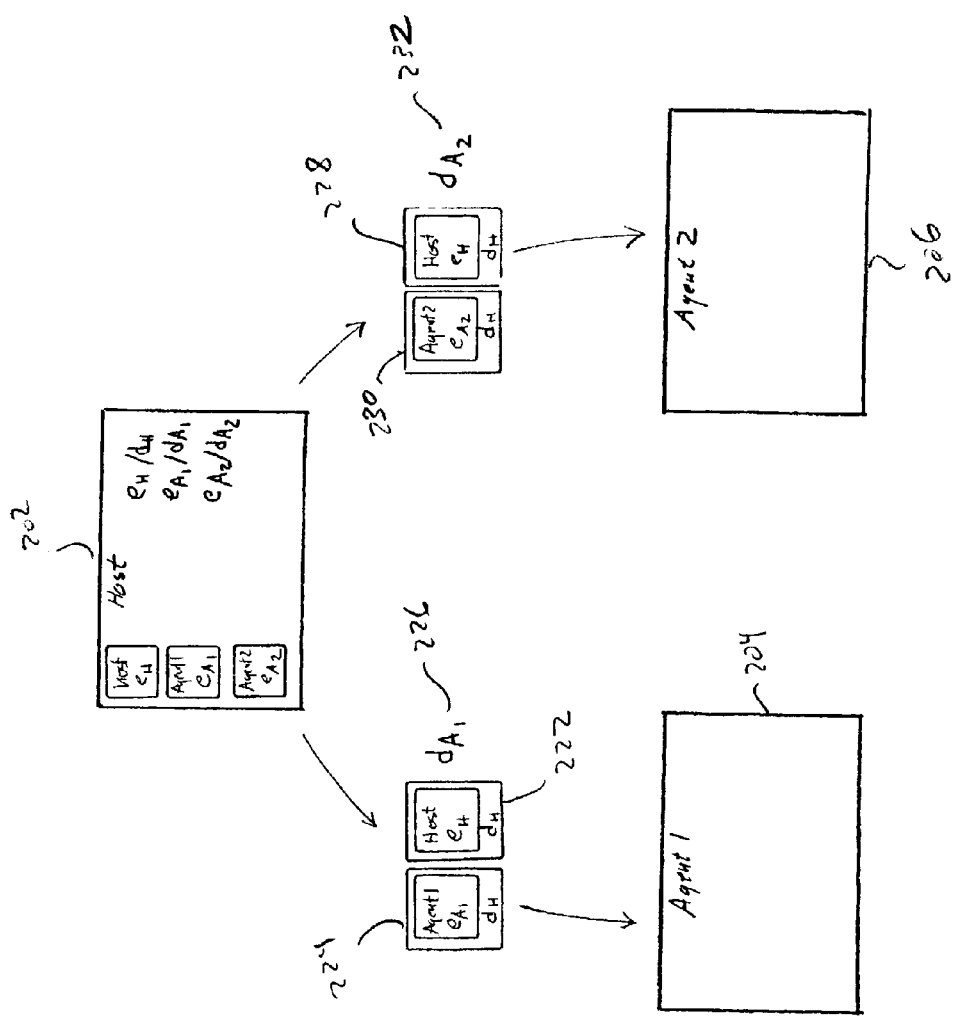

FIGS. 2B-C illustrates launching of the administrative host process (202). In FIG. 2B, the administrative host process has been launched within a computer system and two agent processes 204 and 206 have been launched in several remote computer systems. Of course, in different systems, the sequence of administrative host process launching, security certificate generation, and agent process creation may vary. In FIG. 2B, the administrative host process, as directed by a system administrator or other user, employs functions provided by third-party security-certificate-management tools to generate three different encryption/decryption keys 208-210. The first key pair 208 includes a host encryption/decryption key pair $e_H, d_H$ that is used for verifying and digitally signing security certificates. The public/private key pairs $e_{A1}, d_{A1}$, 209 and $e_{A1}, d_{A2}$ 210 are encryption/decryption key pairs used by agents 204 and 206, respectively, for secure communications, described below. The host administrative process also generates three security certificates 212-214. Each security certificate includes an identifier identifying a security certificate holder, the public key for the security certificate holder, the network address for the security certificate holder, and other information useful in secure communications. Certificate 212 is the host security certificate, and security certificates 213 and 214 are agent security certificates.

As shown in FIG. 2C, a digitally signed host security certificate 222, a digitally signed agent security certificate 224, and a decryption key $d_{A1}$ 226 is physically transported to the first agent 204, and a digitally signed host security certificate 228, a digitally signed agent security certificate 230, and a decryption key $d_{A2}$ 232 is physically transported to the second agent 206. In one embodiment, the administrative host process (202) digitally signs the host security certificates by encrypting all, or a portion of, the security certificates using a decryption function D along with the private decryption key $e_H$. In other embodiments, the host process may encrypt or some other value, using the private decryption key $e_H$, to serve as the digital signature. The agents then extract the host public key $e_H$ from the host security certificates and store the host public key $e_H$ in memory and non-volatile storage for subsequent use in verifying security certificates. Note that the host security certificate ensures to each agent that the host public key $e_H$ indeed is associated with the host computer, because only the host computer, or more specifically, the third-party security-certificate-management tools within the administrative host process, can encrypt or digitally sign the host security certificate, since only the administrative host process has access to the private decryption key $d_H$. The agents also store their digitally signed agent security certificates 224 and 230 and private decryption keys $d_{A1}$ or $d_{A2}$ 226 and 232 for subsequent use in secure communications, described below.

Figure 2D:
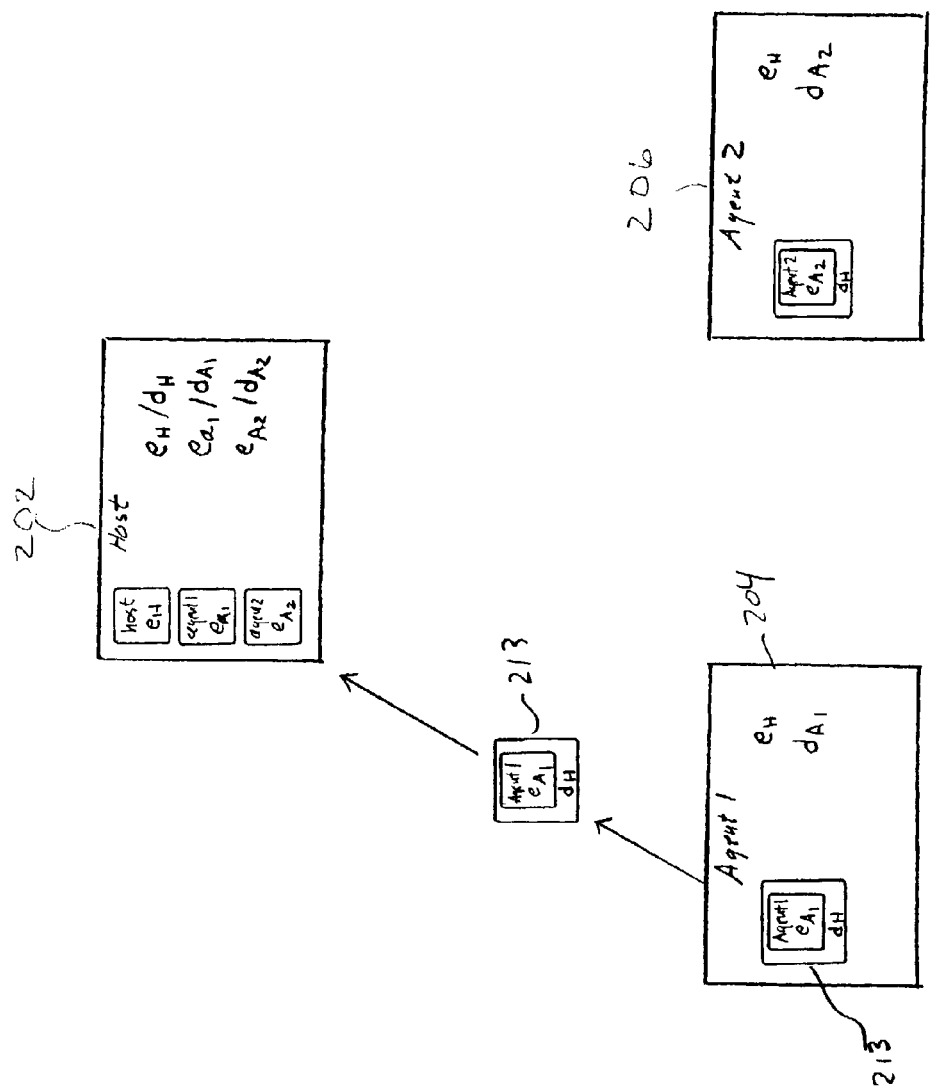
Figure 2E:
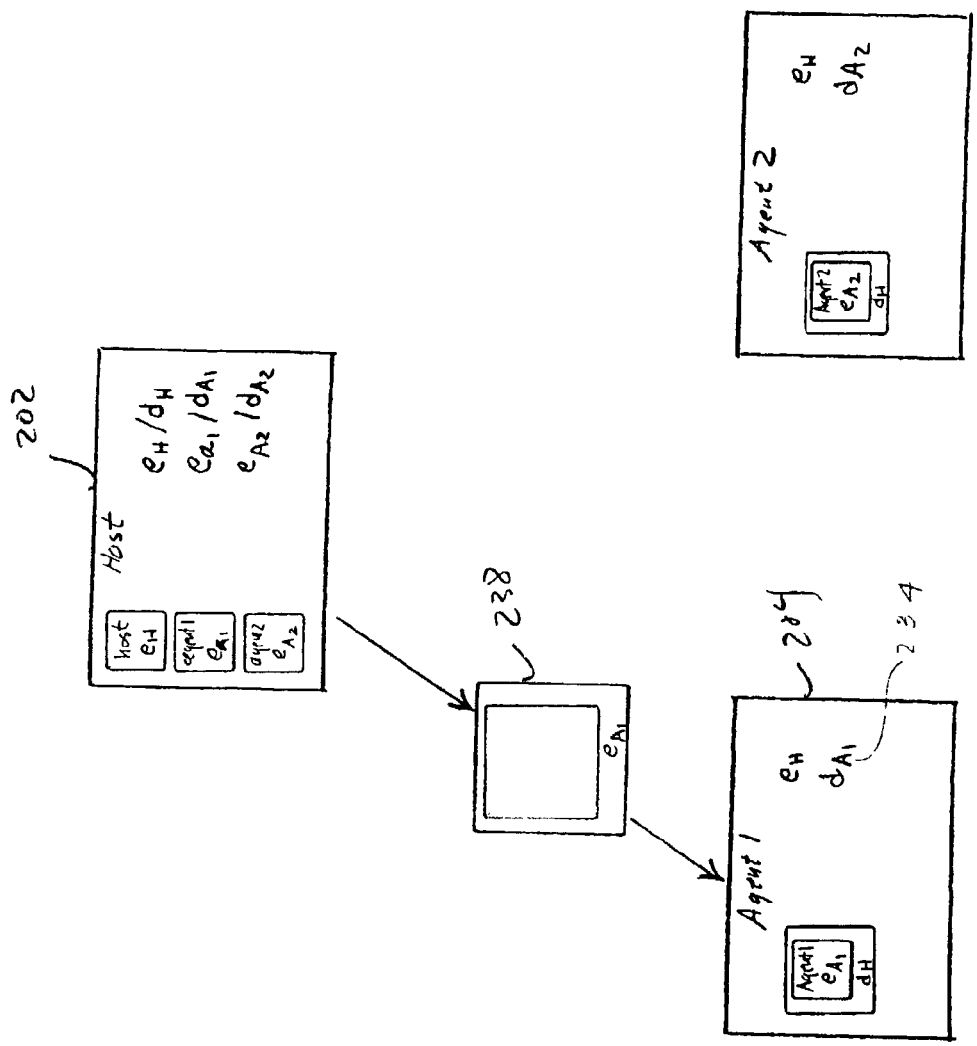
Figure 26:
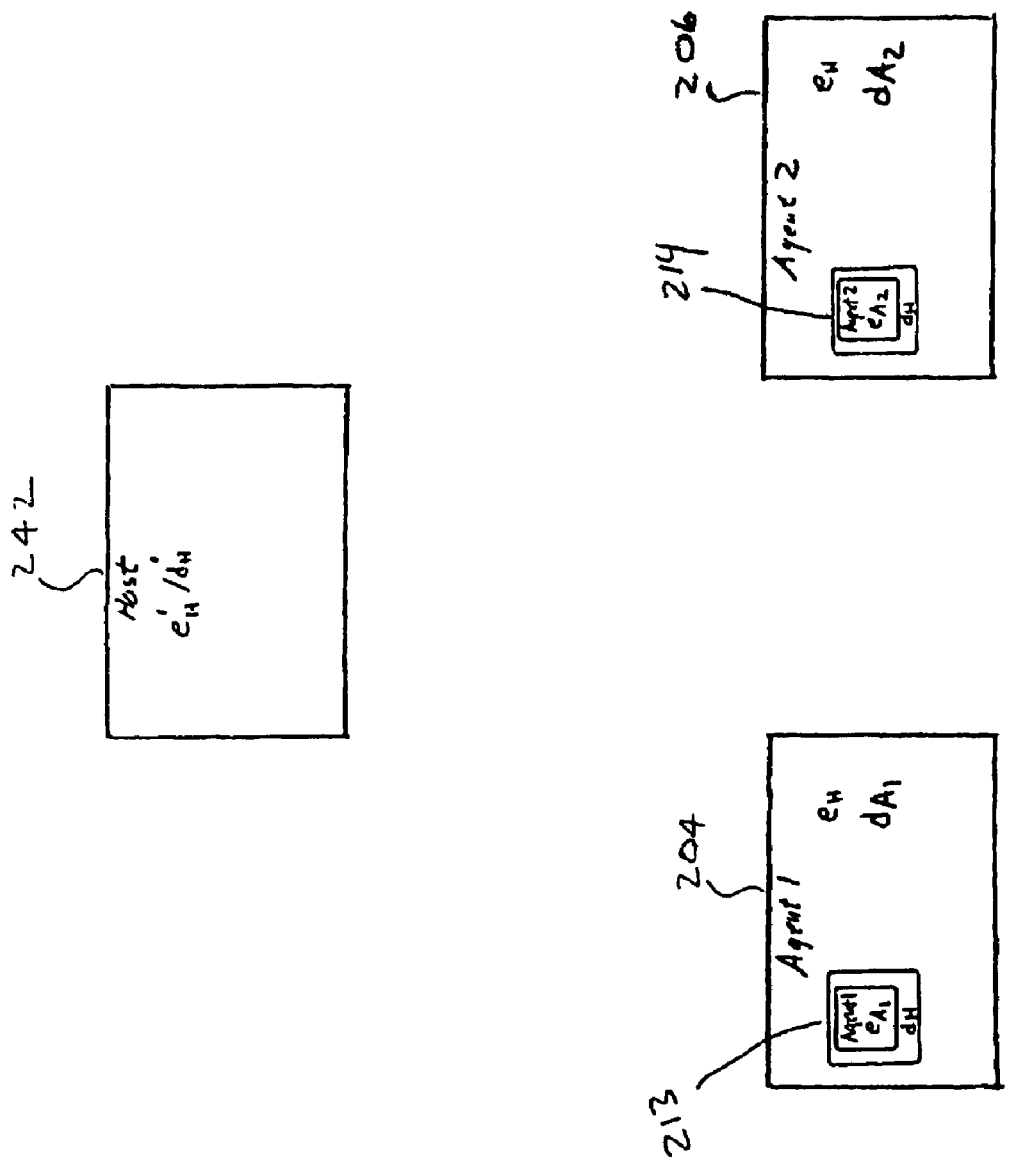

FIGS. 2D-F illustrate use of the security certificates by an agent to establish secure communications with the administrative host process (202). In FIG. 2D, the first agent 204 initiates secure communications with the administrative host process by sending an initial message to the host process that includes the digitally signed security certificate 213 stored in the first agent's memory. The administrative host process receives the security certificate 213, and is able to verify the digital signature, using host public encryption key $e_H$. The administrative host may maintain the agent-identity/public key pair in memory, but need not to, as long the private encryption key $d_H$ is retained to use in decrypting and verifying digitally signed or encrypted security certificates transmitted by agents. Having thus established the correspondence between the public encryption key $e_{A1}$ and the first agent 204, the administrative host process 202 can then transmit a message 238 encrypted using the first agent's public encryption key $e_{A1}$ to the first agent 204, as shown in FIG. 2E. The first agent 204 can use the stored, private decryption key $d_{A1}$. 234 to decrypt the encrypted message 238. Only the first agent, and the administrative host, if the administrative host retains the key, can access private decryption key $d_{A1}$. Similarly, as shown in FIG. 2F, the first agent 204 can encrypt a return message 240 to transmit to the administrative host process 202 using the host public key $e_H$. When the administrative host process 202 receives the encrypted message 240, the administrative host process can use the private host decryption key $e_H$ stored in memory to decrypt the encrypted message 240.

More complex protocols may be employed for secure communications, in order to defeat additional types of potential breaches of secure communications. However, the security certificate-based secure-communications scheme illustrated in FIGS. 2A-F are representative of the security certificate-based secure communications technique.

FIG. 2G illustrates the state of the host/agent system illustrated in FIGS. 2A-F following launching of a process running a subsequent version of the administrative host-process software. Note that, upon launch, the administrative host process has generated a new encryption/decryption key pair $e'_H$ and $d'_H$. The newly launched administrative host process 242 then undertakes steps similar to those described with reference to FIGS. 2B-E, above. However, as shown in FIG. 2G, the security certificates 213 and 214, stored by the agents 204 and 206 in memory and in non-volatile storage, are now out-of-date. The host cannot use the newly generated encryption $e'_H$ to verify security certificates D13 and D14 that were digitally signed using the previous host decryption key $d_H$. As discussed above, the new security-certificate-management tools in the new version of the administrative host software do not accept previously generated keys. Thus, security certificates 213 and 214 are now out-of-date, and invalid. Thus, in order for the agents to establish secure communications with the new administrative host process, new security certificates must be generated and manually transported to each host.

One Embodiment of the Present Invention

The administrative host software upgrade problem, described in the previous subsection, may be addressed in a number of different ways. One can choose never to replace one set of security-certificate-management tools with another, incompatible set of security-certificate-management tools. In the example case, discussed above, the new security-certificate-management tools may be re-engineered to accept previously generated encryption/decryption key pairs. However, the re-engineering effort may be expensive, time-consuming, and, in certain cases, nearly impossible. Other techniques may involve sophisticated cryptographic methods for attempting to validate out-of-date security certificates, but these techniques are time-consuming to develop and expensive. A motivation for the present invention was to find a relatively inexpensive, quickly implemented administrative host-software enhancement to imbue the administrative host software with the potential for backwards compatibility in later versions.

Figure 3B:
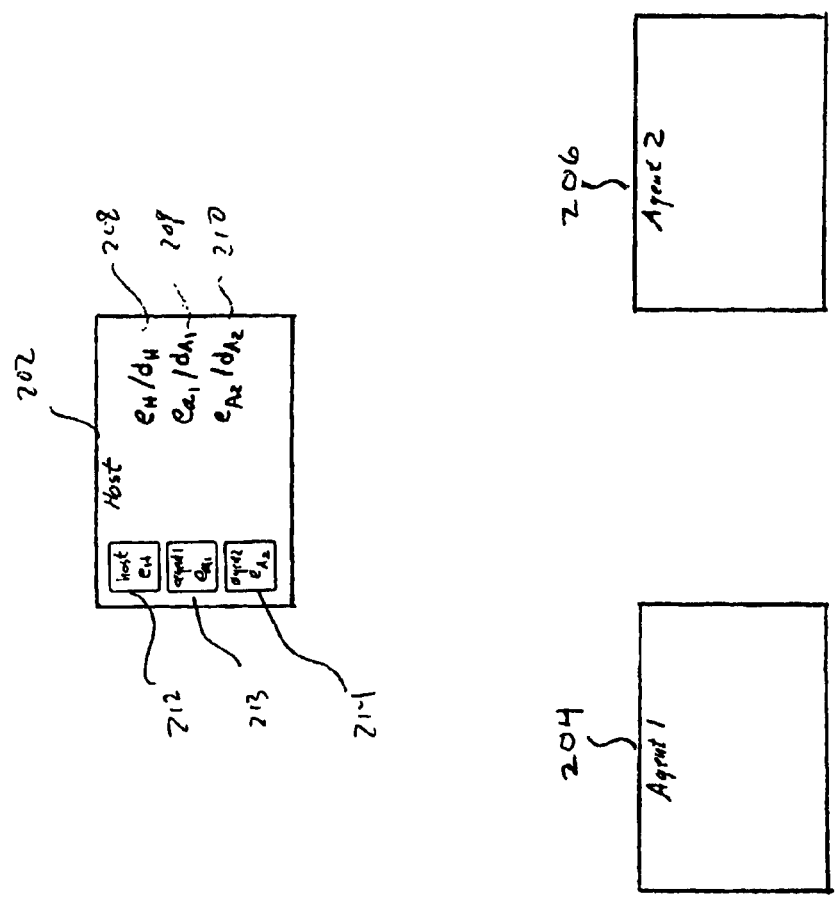

FIGS. 3A-F illustrate a method for enhancing the host/agent system to allow for updating the administrative host software without requiring re-certification of existing agents. FIG. 3A shows the basic components of the enhanced host/agent system. As in the discussion related to FIGS. 2A-F, the host/agent system used as an example in FIGS. 3A-G is a two-agent host/agent system. In FIG. 3A, as in FIG. 2A, discussed in the previous subsection, an administrative host process 302 has been launched on a computer system to provide a user interface and set of management tools to a system administrator or other user, and to interface with agent process 304 and 306 running within specific components or remote computers of a distributed system. Note that the agent processes retain their previously generated security certificates 213 and 214, as well as the host public encryption key $e_H$ and their own private decryption keys $d_{A1}$ and $d_{A2}$, in memory and in non-volatile storage. Note, however, in the enhanced host/agent system, a new entity 308, called the certification-authority ("CA"), is also present. The CA may be a separate process, or may run in the administrative host process. The CA 308 has inherited the previously generated host security certificate 212 and the previously generated host encryption/decryption key pair $e_H, d_H$ 208.

As shown in FIG. 3B, the CA generates a new host decryption key pair $e'_H, d'_H$ 310 and a new host security certificate 312. The CA then exports 314 the new decryption key $d'_H$, a new host security certificate, and the old host security certificate, now the CA security certificate, to the newly launched administrative host process 302.

As shown in FIG. 3C, the new administrative host process 302 now has its own, digitally signed host security certificate 312, a public encryption key that can be used to verify digitally signed security certificates $e_H$, and a private decryption key $d'_H$ that the new administrative host process can use for secure communications. The new administrative host may use new security-certificate-management tools included in the new host administrative host software for other purposes, but the Agent/Host system relies on the CA for generating new digitally signed security certificates, and for providing CA security certificates that include the public key $e_H$ that can be used to verify digitally signed security certificates. Thus, rather than relying on self-signed host-generated security certificates, the new Host/Agent-system security certificate infrastructure relies on the CA to generate signed security certificates.

Figure 3D:
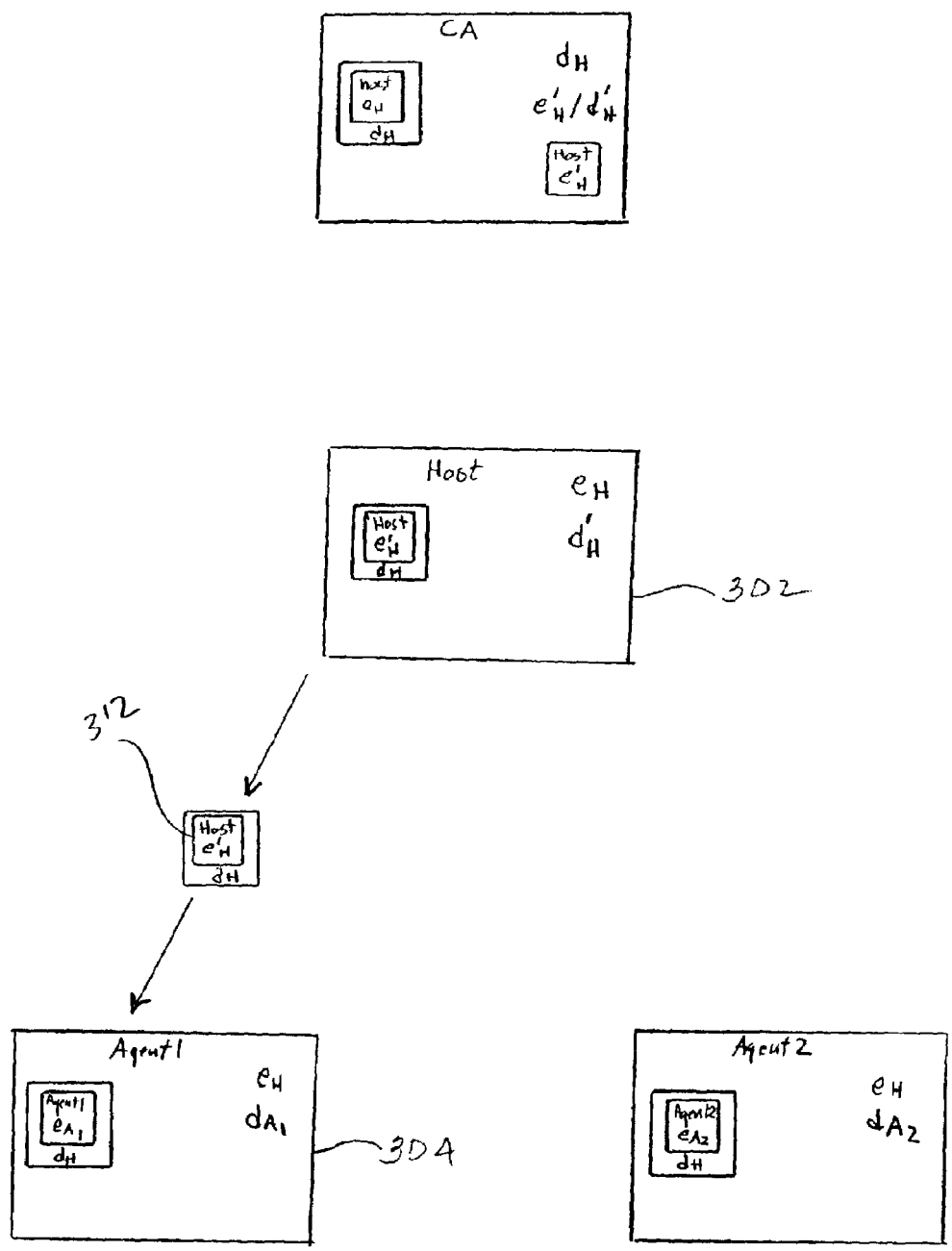
Figure 3E:
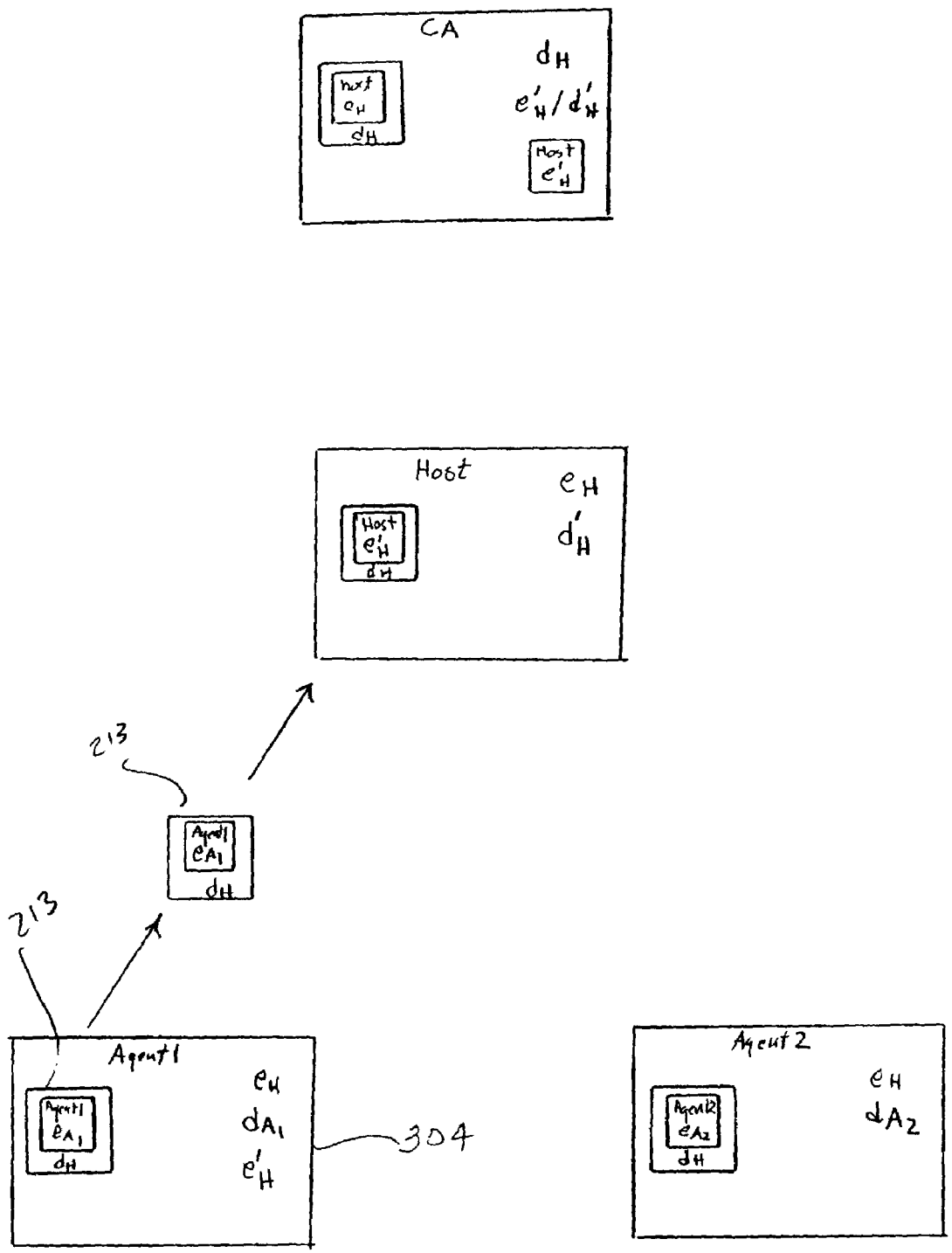
Figure 3F:
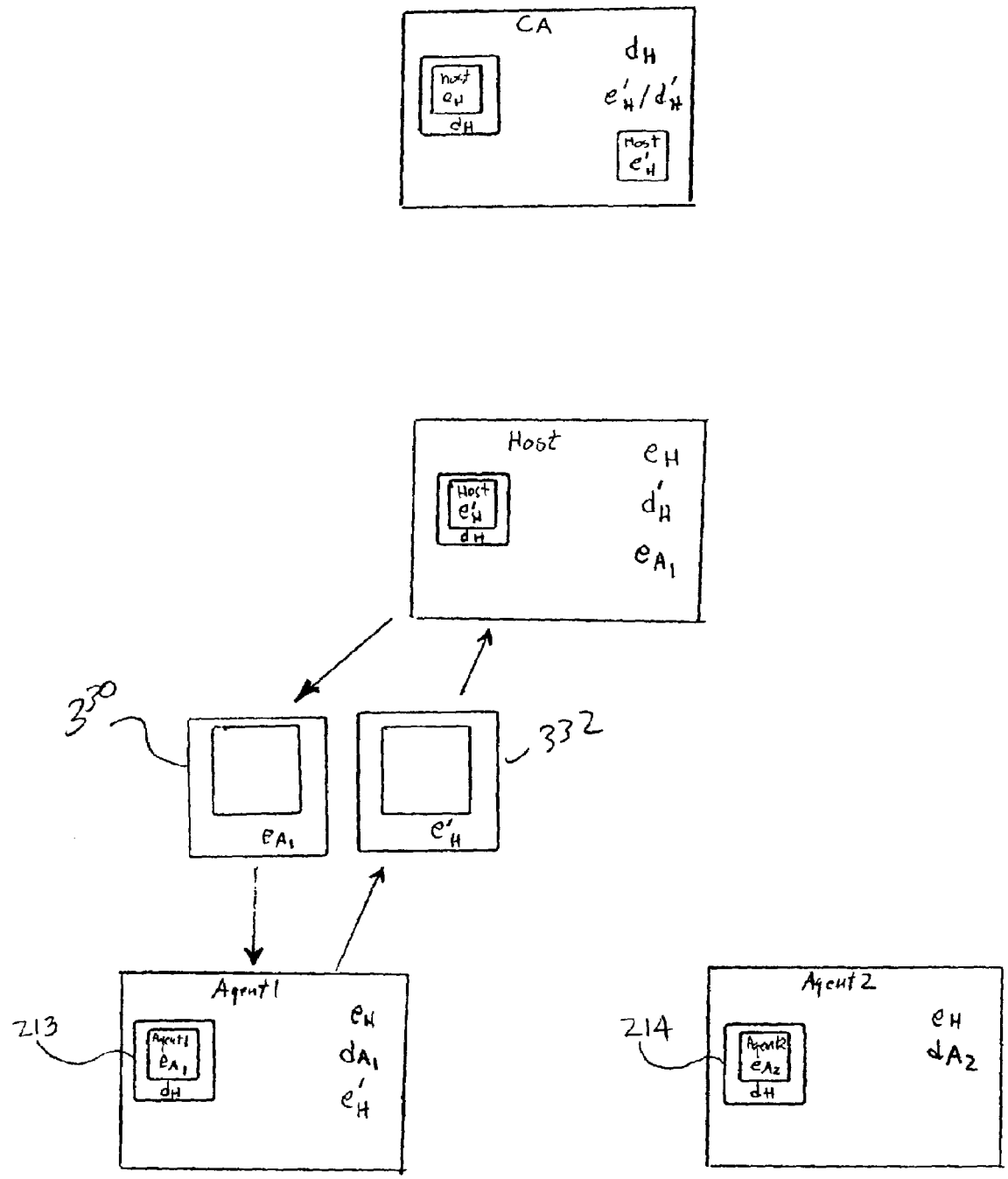

Once the host and agent processes have been configured, shown in FIG. 3C, they are capable of entering into secure communications with one another. For example, as shown in FIG. 3D, the administrative host process 302 can initiate secure communications with the first agent 304 by sending to the first agent a message including the administrative host's security certificate 312. Upon receipt of the administrative host's security certificate 312, as shown in FIG. 3E, the first agent 304 extracts the administrative host's public encryption key $e'_H$, stores the public encryption key $e'_H$ in memory and perhaps in non-volatile storage, and returns, to the administrative host, a message including the first agent's security certificate 213. Upon receipt of the first agent's security certificate 213, as shown in FIG. 3F, the administrative host can extract the first agent's public encryption key $e_{A1}$, store that encryption key in memory and perhaps in non-volatile storage, and use the first agent's public encryption key $e_{A1}$ to send encrypted messages, such as encrypted message 330, to the first agent, who can respond by sending encrypted messages, such as encrypted message 332, back to the administrative host encrypted with the administrative host process' public encryption key $e'_H$. Because only the first agent possesses the private decryption key $d_{A1}$, only the first agent can decrypt messages encrypted with the first agent's public encryption key $e_{A1}$, and similarly, only the host can decrypt messages encrypted with the administrative host's public encryption key $e'_H$.

Thus, the agent/host system continues to maintain the private decryption key $d_H$, necessary for verifying the previously distributed security certificates 213 and 214, in the CA. The CA, and not the administrative host process, is now responsible for generating new security certificates. The above-discussed problem is avoided, because the new security-certificate-management tools employed by the administrative host process are not used for security-certificate-management within the Host/Agent system.

Although the present invention has been described in terms of a particular embodiment, it is not intended that the invention be limited to this embodiment. Modifications within the spirit of the invention will be apparent to those skilled in the art. For example, the technique of the present invention can be employed to provide simple backward compatibility for any host/agent system in which the administrative host employs unique, one-time-only-generated cryptographic data, such as encryption/decryption key pairs, that new security-certificate-management tools within a new version of the administrative host process cannot accept. As noted above, many different types of secure communications protocols may be based on encryption/decryption key pairs and security certificates. The protocols illustrated above with respect to FIGS. 2A-G and 3A-F are meant as illustrative examples only. There are many different possible ways to implement and structure a certification-authority process, and the implementations are highly dependent on the particular techniques used to implement the host/agent system, in general. The certification-authority process may pre-allocate encryption/decryption key pairs for host and agent processes, or may generate them on the fly, in response to requests from host and agent processes.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A backward-compatibility method comprising:
   in a host/agent system that includes an administrative host process that runs administrative host software and agent processes that each securely communicates with the administrative host process using a host security certificate, an agent security certificate, and cryptographic data, providing backward compatibility in administrative-host software by
      providing a higher level certification-authority entity;
      inheriting, by the certification-authority entity from the administrative host process, cryptographic data used for verification and digital signing of security certificates and the host security certificate;
      modifying or replacing the administrative host software to create a new administrative host process;
      generating new cryptographic data and a new host security certificate by the certification-authority entity; and
      distributing, by the certification-authority entity, the new security certificate and the new cryptographic data, as well as the inherited host security certificate, to the new host administrative process.

2. The method of claim 1 wherein cryptographic data includes a public/private encryption/decryption key pair.

3. The method of claim 2 wherein the new host security certificate includes a public encryption key generated by the certification-authority entity and an identifier of the new host administrative process, and wherein the new host security certificate is digitally signed by the certification-authority using the private encryption/decryption key used for verification and digital signing of security certificates.

4. The method of claim 2 further including:
   generating a new public/private encryption/decryption key pair and a new agent security certificate for a new agent process by the certification-authority entity, using the inherited, private decryption key to digitally sign the new security certificate; and
   distributing to the new agent process the new agent security certificate, the new private decryption key, and the inherited host security certificate.

5. The method of claim 1
   wherein the administrative host process initiates secure communications with another process by sending the host security certificate to the other process, which uses the administrative host process' public encryption key to verify that that the host security certificate corresponds to the sending process; and
   wherein an agent process initiates secure communications with another process by sending the agent's security certificate to the other process, which uses the agent's public encryption key to verify that that the agent security certificate corresponds to the sending process.

6. An agent/host system comprising:
   an administrative host process that runs administrative host software;
   agent processes that each securely communicates with the administrative host process using a host security certificate, an agent security certificate, and cryptographic data; and
   a higher-level certification-authority entity, the higher-level certification-authority entity inheriting, from the administrative host process, cryptographic data used for verification and digital signing of security certificates and a host security certificate and generating new cryptographic data and a new host security certificate for a new administrative host process created by modifying or replacing the host administrative software, digitally signing the new security certificate using the inherited cryptographic data and transmitting the new security certificate to the new administrative host process to allow the new administrative host process to securely communicate with the agent processes.

7. The agent/host system of claim 6 wherein cryptographic data includes a public/private encryption/decryption key pair.

8. The agent/host system of claim 6 wherein the new host security certificate includes a public encryption key generated by the certification-authority entity, an identifier of the new host administrative process, and wherein the new host security certificate is digitally signed by the certification-authority using the private encryption/decryption key used for verification and digital signing of security certificates.

9. The agent/host system of claim 6
   wherein the administrative host process initiates secure communications with another process by sending the host security certificate to the other process, which uses the administrative host process' public encryption key to verify that that the host security certificate corresponds to the sending process; and
   wherein an agent process initiates secure communications with another process by sending the agent's security certificate to the other process, which uses the agent's public encryption key to verify that that the agent security certificate corresponds to the sending process.

10. A certification-authority comprising:

a computational entity that communicates with an original administrative host process that run administrative host software, subsequently communicates with a new administrative host process created by modifying or replacing the administrative host software, and inherits, from the original administrative host process, cryptographic data used for verification and digital signing of security certificates and a host security certificate, generates new cryptographic data and a new host security certificate for the new administrative host process, digitally signing the new security certificate using the inherited cryptographic data, and transmits the new host security certificate to the new administrative host process to allow the new administrative host process to securely communicate with agent processes.

11. The certification-authority of claim 10 wherein the new host security certificate includes a public encryption key generated by the certification-authority entity, an identifier of the new host administrative process, and wherein the new host security certificate is digitally signed by the certification-authority using the private encryption/decryption key used for verification and digital signing of security certificates.

12. The certification-authority of claim 10 wherein the original and new administrative host processes initiate secure communications with another process by sending the host security certificate to the other process, which uses the original and new administrative host process public encryption key to verify that that the host security certificate corresponds to the sending process; and wherein an agent process initiates secure communications with another process by sending the agent's security certificate to the other process, which uses the agent's public encryption key to verify that that the agent security certificate corresponds to the sending process.

* * * * *

UNITED STATES PATENT AND TRADEMARK OFFICE
CERTIFICATE OF CORRECTION

PATENT NO. : 7,305,547 B2 Page 1 of 1
APPLICATION NO. : 10/186901
DATED : December 4, 2007
INVENTOR(S) : Mehmet Musa It is certified that error appears in the above-identified patent and that said Letters Patent is hereby corrected as shown below:

In column 10, line 8, in Claim 4, after "inherited" delete ",".

Signed and Sealed this

Fifteenth Day of July, 2008

JON W. DUDAS
*Director of the United States Patent and Trademark Office*